(12) United States Patent
Zarrella et al.

(10) Patent No.: US 8,296,166 B2
(45) Date of Patent: Oct. 23, 2012

(54) FAMILY PROTECTION INSURANCE METHOD AND SYSTEM

(75) Inventors: Ron Zarrella, Woodcliff Lake, NJ (US); Elliot Melis, Chappaqua, NY (US); Joseph A. Petrini, Hopewell Junction, NY (US); William Morello, Kings Park, NY (US); Youri Matiounine, White Plains, NY (US)

(73) Assignee: New York Life Insurance Company, New York, NY (US)

( * ) Notice: Subject to any disclaimer, the term of this patent is extended or adjusted under 35 U.S.C. 154(b) by 753 days.

(21) Appl. No.: 12/117,382

(22) Filed: May 8, 2008

(65) Prior Publication Data
US 2009/0024422 A1    Jan. 22, 2009

Related U.S. Application Data

(60) Provisional application No. 60/950,750, filed on Jul. 19, 2007.

(51) Int. Cl.
*G06Q 40/00* (2012.01)
(52) U.S. Cl. .......................................................... 705/4
(58) Field of Classification Search ...................... 705/4
See application file for complete search history.

(56) References Cited

U.S. PATENT DOCUMENTS 7,324,950 B2 *   1/2008  Sherman ........................... 705/4
7,370,000 B2 *   5/2008  Sherman ........................... 705/4

OTHER PUBLICATIONS

AFA Veteran Benefits Association: Level Term Life Insurance Plan; http://www.afavba.org, Wayback Machine, Aug. 13, 2006, pp. 1-4.*
Benefit House: What is Universal Life Insurance,http://www.benefithouse.com/faq/life_insurance/universal.html, 2000-2005, p. 1.*
FinancialWeb: Flexible Life insurance Policies, http://www.finweb.com/insurance/flexible-life-insurance.html, Wayback Machine, Oct. 17, 2006, p. 1.*
Georgia Caselaw: *Gulf Life insurance Company v. Brown et al.,* http://www.lawskills.com/case/ga/id/40933/), Dec. 1, 1986, pp. 1-6.*
Investopedia: Let Life Insurance Riders drive your coverage, May 15, 2007, p. 1.*
Taylor, Don: Considering whether to convert term policies, Sep. 27, 2005, Bankrate.com, p. 1.*
ITT Hartford: Portability and Conversion side by side. A simple way to compare your options, 2006, pp. 1-6.*

* cited by examiner

*Primary Examiner* — Bijendra K Shrestha
(74) *Attorney, Agent, or Firm* — Seth H. Ostrow; Ostrow Kaufman LLP

(57) ABSTRACT

Family protection insurance provides for a flexible and adjustable insurance policy that can be adjustable to be consistent with changes in the adult's insurance needs. The insurance policy is a term policy where, at predefined intervals, the policy owner may increase the policy value without requiring additional underwriting. The policy owner may also, at any time, convert all or a portion of the term policy to permanent insurance, while still maintaining the term policy and replenish the death benefit amounts of the term policy through the intermittent value increments. Thus, adults may adjust the death benefits of the term policy and convert the term policy death benefits to permanent insurance consistent with changing insurance needs.

29 Claims, 3 Drawing Sheets

| Sex | Male | | | | | Female | | | | |
|---|---|---|---|---|---|---|---|---|---|---|
| Age/Class | Std | SelStd | NonSm | Pref | SelPref | Std | SelStd | NonSm | Pref | SelPref |
| 18 | 1.8 | 1.18 | 0.86 | 0.63 | 0.49 | 0.96 | 0.76 | 0.6 | 0.45 | 0.39 |
| 19 | 1.8 | 1.18 | 0.86 | 0.63 | 0.49 | 0.96 | 0.76 | 0.6 | 0.45 | 0.39 |
| 20 | 1.8 | 1.18 | 0.86 | 0.63 | 0.49 | 0.96 | 0.76 | 0.6 | 0.45 | 0.39 |
| 21 | 1.85 | 1.19 | 0.87 | 0.63 | 0.49 | 1.02 | 0.78 | 0.61 | 0.46 | 0.39 |
| 22 | 1.88 | 1.19 | 0.87 | 0.63 | 0.49 | 1.11 | 0.82 | 0.61 | 0.46 | 0.39 |
| 23 | 1.89 | 1.22 | 0.9 | 0.66 | 0.52 | 1.18 | 0.84 | 0.64 | 0.49 | 0.41 |
| 24 | 1.9 | 1.23 | 0.9 | 0.66 | 0.52 | 1.28 | 0.87 | 0.64 | 0.49 | 0.41 |
| 25 | 1.92 | 1.25 | 0.91 | 0.66 | 0.52 | 1.32 | 0.89 | 0.65 | 0.5 | 0.41 |
| 26 | 1.99 | 1.28 | 0.94 | 0.67 | 0.52 | 1.35 | 0.9 | 0.66 | 0.5 | 0.41 |
| 27 | 2.04 | 1.29 | 0.95 | 0.67 | 0.52 | 1.41 | 0.93 | 0.67 | 0.52 | 0.42 |
| 28 | 2.1 | 1.31 | 0.97 | 0.68 | 0.54 | 1.46 | 0.94 | 0.7 | 0.53 | 0.44 |
| 29 | 2.17 | 1.32 | 0.98 | 0.69 | 0.54 | 1.5 | 0.96 | 0.7 | 0.55 | 0.44 |
| 30 | 2.22 | 1.34 | 1 | 0.71 | 0.56 | 1.54 | 0.97 | 0.71 | 0.55 | 0.44 |
| 31 | 2.29 | 1.37 | 1.03 | 0.72 | 0.57 | 1.6 | 0.99 | 0.72 | 0.55 | 0.45 |
| 32 | 2.36 | 1.43 | 1.07 | 0.73 | 0.57 | 1.64 | 0.99 | 0.73 | 0.57 | 0.45 |
| 33 | 2.41 | 1.44 | 1.09 | 0.75 | 0.59 | 1.69 | 1.01 | 0.75 | 0.58 | 0.46 |
| 34 | 2.48 | 1.45 | 1.1 | 0.76 | 0.59 | 1.74 | 1.04 | 0.76 | 0.59 | 0.47 |
| 35 | 2.55 | 1.49 | 1.13 | 0.76 | 0.6 | 1.79 | 1.04 | 0.77 | 0.59 | 0.47 |
| 36 | 2.73 | 1.61 | 1.23 | 0.83 | 0.64 | 1.95 | 1.12 | 0.83 | 0.65 | 0.51 |
| 37 | 2.93 | 1.74 | 1.33 | 0.92 | 0.68 | 2.1 | 1.2 | 0.89 | 0.67 | 0.54 |
| 38 | 3.13 | 1.85 | 1.44 | 0.98 | 0.73 | 2.26 | 1.29 | 0.96 | 0.73 | 0.59 |
| 39 | 3.35 | 2 | 1.56 | 1.06 | 0.78 | 2.44 | 1.39 | 1.02 | 0.78 | 0.62 |
| 40 | 3.59 | 2.15 | 1.68 | 1.16 | 0.84 | 2.63 | 1.49 | 1.09 | 0.85 | 0.67 |
| 41 | 3.93 | 2.34 | 1.82 | 1.24 | 0.91 | 2.94 | 1.67 | 1.21 | 0.94 | 0.75 |
| 42 | 4.28 | 2.53 | 1.95 | 1.34 | 0.98 | 3.24 | 1.85 | 1.33 | 1.03 | 0.83 |
| 43 | 4.68 | 2.75 | 2.12 | 1.45 | 1.04 | 3.59 | 2.05 | 1.47 | 1.14 | 0.93 |
| 44 | 5.08 | 2.97 | 2.28 | 1.55 | 1.12 | 3.96 | 2.28 | 1.63 | 1.25 | 1.03 |
| 45 | 5.55 | 3.21 | 2.44 | 1.67 | 1.21 | 4.39 | 2.54 | 1.79 | 1.38 | 1.13 |
| 46 | 6.05 | 3.48 | 2.63 | 1.81 | 1.29 | 4.77 | 2.74 | 1.93 | 1.51 | 1.22 |
| 47 | 6.57 | 3.77 | 2.87 | 1.99 | 1.41 | 5.22 | 2.96 | 2.05 | 1.6 | 1.3 |
| 48 | 7.15 | 4.08 | 3.11 | 2.16 | 1.52 | 5.67 | 3.19 | 2.21 | 1.74 | 1.4 |
| 49 | 7.78 | 4.44 | 3.38 | 2.36 | 1.66 | 6.17 | 3.43 | 2.37 | 1.86 | 1.51 |
| 50 | 8.47 | 4.82 | 3.64 | 2.55 | 1.79 | 6.72 | 3.72 | 2.54 | 2 | 1.61 |

140

FAMILY PROTECTION INSURANCE METHOD AND SYSTEM

CLAIM OF PRIORITY

The present application claims the benefit of U.S. Provisional Application Ser. No. 60/950,750, entitled "FAMILY PROTECTION INSURANCE METHOD AND SYSTEM" having a filing date of Jul. 19, 2007.

COPYRIGHT NOTICE

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

This invention relates to the field of insurance, and more particularly to methods and systems for providing family protection life insurance having adjustable terms to accommodate changing insurance needs.

BACKGROUND OF THE INVENTION

Insurance provides economic protection against losses that may be incurred due to a random event, such as death, illness, or an accident. There are several forms of insurance, such as life insurance, health insurance, disability insurance, or long-term care insurance. Under life insurance, for instance, an insurance company agrees to pay a specific amount (e.g., face value) to a designated beneficiary on the death of a specified individual (e.g., the insured) in consideration for premium payments received from the purchaser (e.g., the owner or the acquiring party) of the insurance policy.

There are many types of life insurance, but the most common types include term, ordinary, and universal life insurance. Under a term life insurance policy, the term of the policy is set for a defined period, such as one year. If the insured dies during the term of the policy, the designated beneficiary receives a death benefit generally equal to the face value of the policy. If the policy expires prior to the death of the insured, no benefit is due. The premium for life insurance policies is generally based on mortality rates and therefore increases with the age of the insured.

Unlike term insurance, a whole life insurance includes a savings component in addition to the mortality gain or loss component. A portion of the policy premiums is invested with the anticipation of producing savings. The savings are used to build cash value for the policy that can be redeemed, borrowed against, or used to purchase other investment vehicles.

Universal life insurance has the potential of providing a greater savings component than whole life insurance. Universal life affords the policyholder with the flexibility to modify the policy terms, including the premium payments and amount of coverage. As a result, the amount and frequency of premium payments may increase or decrease over the term of the policy. Being able to change the premium amount and frequency provides the policyholder with the capability of potentially increasing the associated cash value. The potential greater savings associated with universal life insurance are available for loans and other investments. However, the accumulated interest may be taxable upon surrender of the policy.

A common limitation of currently available life insurance policies is that they typically fail to conform to emerging problems or concerns for the insured. By way of example, a person may acquire a first insurance policy when they first get married. Their insurance needs can change with the growth of a family, including having or adopting children, and with other factors such as increased income and lifestyle. Classic insurance examples may be limited because the static nature of the policies can be inconsistent with the insured's fluid family status. To accommodate these changing circumstances, the heads of a family often need to reevaluate their insurance needs and to purchase additional insurance as desired. Each purchase requires the insured to figure out what type of and how much insurance is needed and to undergo a new underwriting procedure for each purchase. If the insured forgets or neglects to purchase the additional insurance, the family with expanded or changed needs may very well find itself inadequately protected if and when the insured passes away.

As such, there currently exists a need for a more flexible insurance protection product that allows families to adjust their protection to better conform to changes in the family or its needs or lifestyle.

SUMMARY OF THE INVENTION

Family protection insurance provides for a flexible and adjustable insurance policy that can be adjusted to be consistent with changes in the adult's insurance needs. The family protection insurance policy may be processed by a computerized processing system to monitor and track insurance characteristics, including premium calculations, adjustments, payments, benefit pay-outs and monitoring or otherwise tracking the policy itself, including the below-described aspects to the adjustable policy.

In one embodiment, the insurance policy is a term insurance policy that is underwritten in a typical fashion. At predefined intervals, the policy owner may increase the policy face amount(s) without requiring additional underwriting. In addition to the increasing of the death benefit(s) of the policy, the policy owner is presented additional options to manage the allocation of the death benefits between the term policy and a permanent policy. The policy owner may, at any time, convert all or a portion of the term policy to a permanent life policy, while still maintaining the term policy, if still active, and subject to a minimum face amount. The policy owner may then elect additional death benefits in defined incremental units to replenish the death benefits of the term policy at the predefined time intervals, subject to the maximum face amount.

In some embodiments, the family protection insurance policy includes a minimum limit and a maximum limit. The policy owner may increment the term policy up to the maximum limit and then convert death benefits to the permanent policy. The periodic increment allows for the adjustment of the policy without requiring further underwriting.

Additionally, the family protection insurance policy provides dual adult and child protection. The policy may be applicable to both adults, also referred to as domestic partners (e.g., parents, business partners, married couples, lifetime partners) and additionally adjustable by the policy owner for both adults. One or both may be the policy owner. As described in further detail below, the family protection insurance method and computer program provides additional benefits based on the incremental changes and insurance needs for a growing family.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
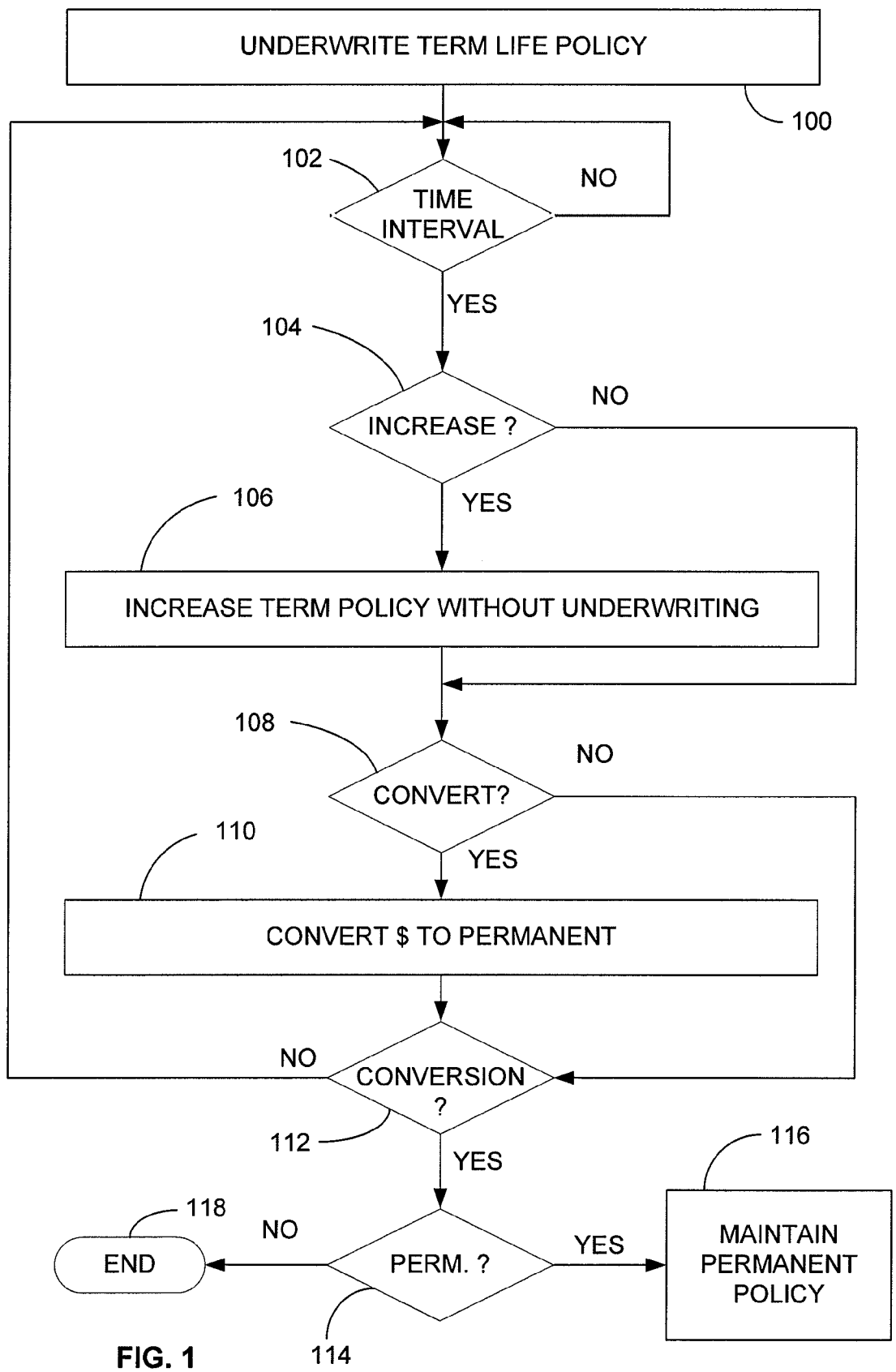
FIG. 1 illustrates a method for providing a family protection insurance product according to one embodiment of the present invention.

FIG. 1 illustrates a flowchart of one embodiment of a method for providing family protection insurance. The family protection insurance is an adjustable policy whereby the policy owner may adjust an original term policy by converting death benefits to a permanent policy and also incrementally increasing the death benefits of the term policy. The term policy may have an upper limit, which represents the highest allowable amount of death benefits for the policy. The term policy may also have a minimum face amount limit, which represents the lowest allowable amount of death benefits for the policy. The defined time may be prescribed by the terms of the policy, such as two years for the face amount increase, or another defined time. The two year time period, for example, offers enough time between intervals for the occurrence of events that warrant a change in a family's insurance needs, but not leaving a policy owner with inadequate insurance protection. The term policy may be similar to standard term insurance policies where a policy owner pays a defined premium amount and receives a corresponding level of death benefits in the event of the death of the insured. The permanent policy may be a whole life policy, a modified whole life policy, custom whole life policy, universal life policy, survivorship whole life policy, by way of example.

The flowchart represents the insurance methodology that collectively provides the adjustable insurance protection consistent with the growing needs of a family. In this embodiment, a first step is underwriting a policy 100. This step may be done in normal fashion consistent with standard underwriting procedures. As described in further detail below, the underwriting includes referencing actuarial tables for quoting various rates for insurance coverage. The underwriting is also based upon a defined term policy amount. In one embodiment, the policy may have a defined upper limit of available death benefits, such as $500,000 and a lower limit of available death benefits, such as $100,000. The policy may also have a set term, such as 10 years. Additionally, the family protection insurance product is also to be written for both adult members of a family, such as a married couple, parents, domestic partners, business partners, etc. Children may also be covered with the policy, for example, for $10,000. For example, in some embodiments, children born to or legally adopted by an adult insured are covered for $10,000 each. The coverage for the children may end if the policy terminates, the coverage is converted or at a policy anniversary date, such as when the children reach a specified age, for example twenty-five years. In some embodiments, coverage for children can be converted to permanent insurance on a specified option date that might occur at specified intervals such as every three years. In some embodiments, conversion can occur on the date the policy ends or at a policy anniversary date, such as when the children reach a specified age.

In the family protection insurance product, the policy owner may elect to increase benefit coverage at selected time intervals. In step 102, a decision is made if the time period occurs. In one embodiment, on a 10 year term policy, the time period may be, for example, two years or upon the birth or adoption of a child. In step 102, if the time period has not occurred yet, the term policy remains in effect at its current levels of death benefits.

When the answer to the inquiry of step 102 is in the affirmative, the next step is a determination if the policy owner wishes to increase the policy amount, step 104. In one embodiment, the policy may define incremental units, such as $50,000 for example. The policy owner may elect one or more of these incremental units, such as for example two incremental units per time period.

If the policy owner elects to increase coverage, the insurance policy advances to step 106 where the insured increases protection without the requirement of additional underwriting. The policy owner then pays a larger premium to reflect this increase in coverage. The premium increase may be defined when the term policy is initially issued because the death benefit increase and subsequent premium increase do not undergo additional underwriting. The insured may experience growth factors that contribute to the adjustment of the policy, such as for example having a baby or getting a promotion. The policy owner may be in a position to acquire or desire a larger life insurance policy, as well as be able to afford higher premium costs. At the predefined time intervals, the policy owner may accomplish these goals without having to cancel the existing policy and undergo additional underwriting steps.

If the death benefit amount increases, the original issue age premium rate applies to the additional death benefit. That rate remains level for the remainder of the original period, such as a 10 year period. In other words, the death benefit change is treated as though the policy had the current death benefit from issue. This is further illustrated by Equation 1.

$$\text{Increase in Premium Payment} = (\text{Original Age Premium Rate}) \times (\text{Increase in Death Benefits})/1000. \quad \text{Equation 1:}$$

By way of Example, if at the end of year 5, a 30 year old male nonsmoker increases his death benefit at issue ($100,000) by an additional $100,000 for a total death benefit of $200,000, the same premium rate applies to all death benefits: $1.00 premium charge per $1000.00 coverage. So the increase in total annual premium in year six to obtain another $100,000. of coverage would be $100 (($100,000.00/$1000)×$1.00).

If the policy owner, in step 104, declines to increase the term policy amount or in step 106 increases the amount, the policy owner is provided the additional option of converting death benefits to a permanent life insurance policy, step 108. As noted above, the term policy may have an upper limit, so the policy owner may convert amounts of insurance coverage to remain under the upper limit of death benefits for the term policy. In another example, the insured may have a need for permanent insurance over term insurance and simply wish to convert as much as possible to the permanent policy, while still honoring the lower limit requirements of the term policy.

In step 108, if the policy owner elects to convert death benefits, in step 110, a selected amount of death benefits is transferred to a permanent insurance policy. As shown in FIG. 1, the convert step is shown occurring immediately after a decision to increase the insurance coverage, but this is exemplary in nature only. It is understood that in one embodiment, the policy owner may convert death benefits at any time during the term of policy and it is not specifically restricted to being at predefined time intervals.

In an example, in the case of a partial conversion, the death benefit of the policy is reduced by the converted amount, such as illustrated by Equation 2.

$$\text{Decrease in Premium Payments} = (\text{Premium Rate}) \times (\text{Converted Death Benefit})/1000. \quad \text{Equation 2:}$$

By way of example, for a 30 year old male nonsmoker, if at the end of year 7, the insured elects to convert 50% ($100,000) of his total death benefit ($200,000), then there is a decrease in total annual premium for the policy in year eight of $100 (($100,000.00/$1000.00)×$1.00).

In the event the policy owner does not convert death benefits, in step 108, or does convert death benefits in step 110, the term insurance policy remains in effect in its normal policy terms and conditions until the next time interval or expiration. In one embodiment, a next step is determining if the term conversion privilege or term policy has expired, step 112. If the term has not expired, the insurance policy reverts back to a waiting period until the next pre-determined time period. As noted above, during this time period, the policy owner may again elect to convert death benefits to the permanent policy, if benefits are so available.

If the conversion privilege does expire in step 112, the next decision is if there is a permanent policy, step 114, generated through the conversion of death benefits by the policy owner. If yes, the insurance policy maintains the permanent life insurance, step 116 in the converted amount. If the policy owner did not convert any amount, and hence there is no permanent policy to maintain, the term policy thereby fully expires at the end of the term consistent with standard term policy techniques, step 118.

Figures 2, 4:
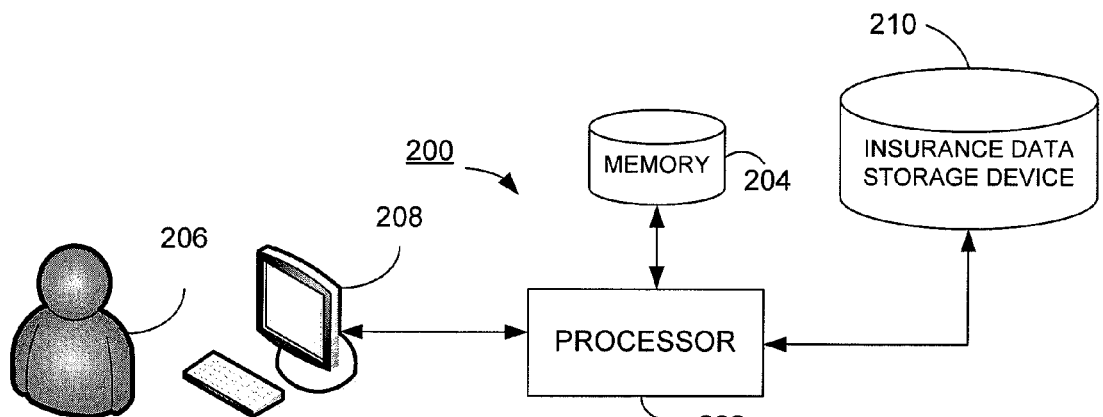
FIG. 2 illustrates an exemplary actuarial table for one embodiment of the family protection insurance product.
FIG. 4 illustrates one embodiment of a system for providing family protection insurance policy.
Figure 3:
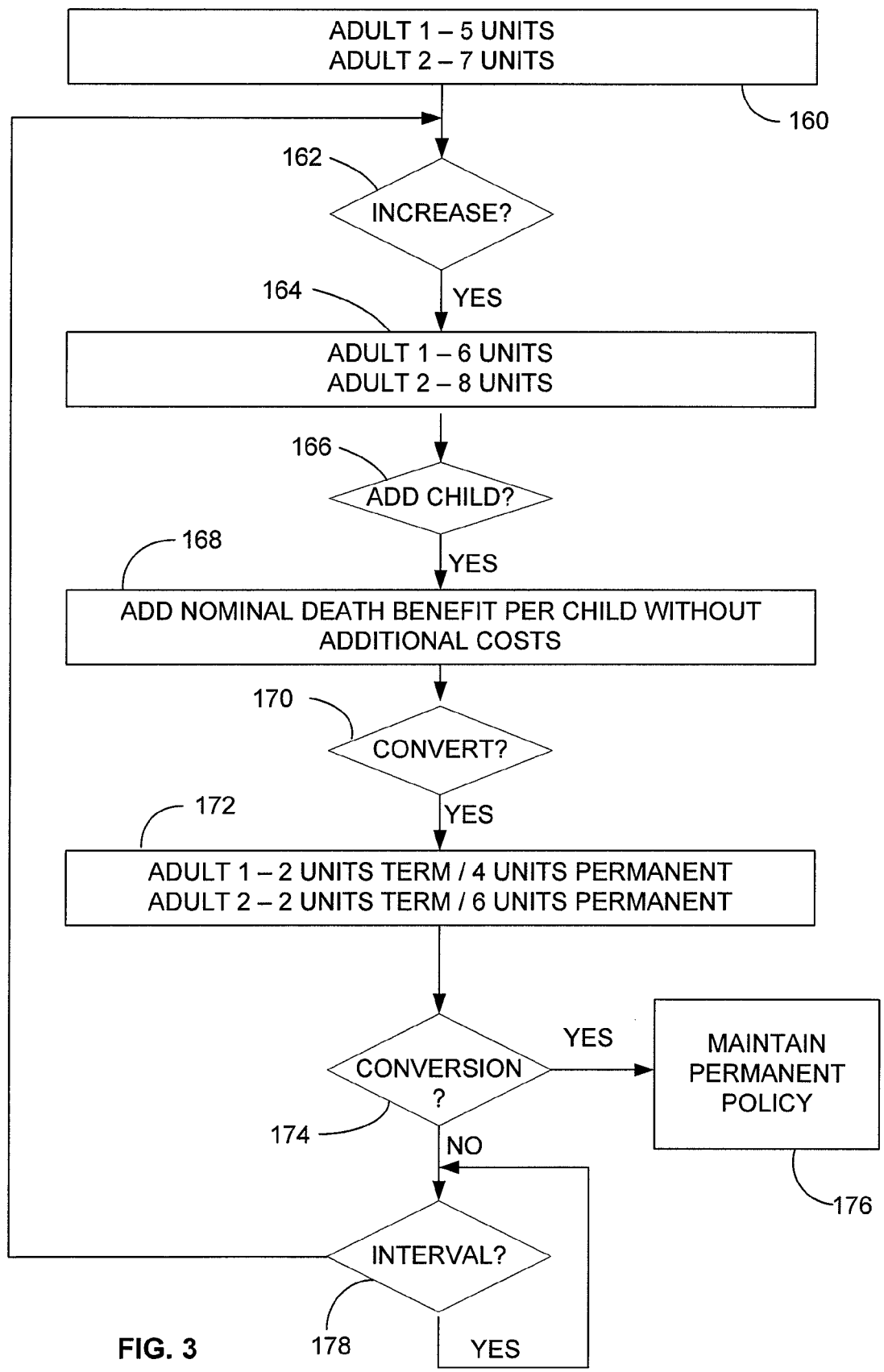
FIG. 3 illustrates a flowchart of one embodiment of a family protection insurance policy.

While generally described above, there are additional aspects that may be incorporated in the life insurance policy. FIGS. 2-3 below describe one specific embodiment of an insurance policy using the family protection insurance product, whereby both adults can adjust their insurance needs with a growing family.

FIG. 2 illustrates one example of an actuarial chart used for determining policy premiums. The table 140 provides representative premium rates for both male and female clients based on prescribed ratings, showing here as the standard rating, select standard rate, non-smoker rating, preferred rating and selected preferred rating. Additionally, the table 140 includes rates as broken down by age categorization. The actuarial table represents sample premium policy rates for the family protection insurance plan described herein.

FIG. 3 illustrates a specific example of a family utilizing the family protection insurance policy for their specific insurance needs. In this example, the first step, step 160, is the underwriting process where each family member may request a predefined number of insurance units. The following example uses concrete dollar amount and time limits to assist in the description of the invention, but it is understood that these concrete amounts are merely exemplary in nature and not meant to be limiting as noted herein.

In one embodiment, defined incremental units may be designated at $50,000 per unit. A defined minimum face amount for the term policy may be 2 units, or $100,000 and the defined maximum face amount for the term policy may be 10 units, or $500,000. Therefore, in the initial underwriting step 160, as an example, the mother may select 5 units of coverage ($250,000) and the father selects 7 units of coverage ($350,000). In this embodiment, the term policy pays-out a death benefit to designated beneficiaries in the event of the death of either of the two adults. The policy may provide for additional specified benefits in certain circumstances. For example, in some embodiments, an additional benefit amount, such as $200,000 will be paid if both adult insureds die within a specified period of the policy, such as within the first ten policy years. As described further below, the term policy further includes a nominal death benefit in the event of the death of any children that the adults may already have. While used herein, the terms mother and father inherently presume children, this nomenclature does not require children, but rather generally refers to individuals seeking insurance coverage, which may or may not already have children.

In this example, suppose the adults have one child at the underwriting term. The family protection insurance policy may include a nominal death benefit, such as $10,000 for each child, at no additional cost. The policy may define protection for children based on age, such as coverage for children older then 15 days but younger then 17 years of age. Additionally, the child death benefit may be set to expire when the child reaches a set age, for example, 25 years of age, or when the policy expires.

In this example, the family protection insurance policy may be a 10 year term policy, therefore, if the parents have a child 16 years old, the child's potential death benefit expires at age 25 (assuming the policy remains in effect for the full duration)

Within the family protection insurance policy, the policy owner(s) have a contractual right to adjust the death benefit of each insured adult. Step 162 allows for either adult to increase the death benefit. In one embodiment, the policy may allow for a death benefit increase of up to 2 units ($100,000) on an annual basis, such as on the policy anniversary. It is noted that in one embodiment, either policy owner may decrease each policy amount at any time. Furthermore, any policy increase or decrease must stay within the upper or lower limits. Consistent with the terms of the insurance policy, any increase of units is conducted without requiring any additional underwriting.

In this example, in step 162, both adults select to increase by 1 unit each. Therefore, in step 164, the family protection insurance policy provides the mother 6 units ($300,000) and the father 8 units ($400,000) of death benefits. These increases are still within the upper limit of 10 units ($500,000) of this embodiment.

In step 166, the adults may have had another child. If so, step 168 of the family protection insurance policy adds another nominal death benefit per child without additional costs. In one embodiment, the terms for adding a child may be specifically delineated in the terms of the policy, such as covering children acquired by either childbirth or a legal adoption and being within a defined age range, such as between 15 days old and 17 years of age. The earlier described death benefits attached at the underwriting of the policy, but the per child death benefits are included in this policy at no additional cost and may require further underwriting.

In step 170, consistent with the family protection insurance policy, one or both adults may select to convert a portion of their term-based death benefit units to a permanent life insurance policy. If so elected, step 172 illustrates the example where both mother and father elect to keep two units ($100,000) in the term policy and convert 4 units ($200,000) and 6 units ($300,000) to the permanent policy. This conversion keeps the term policy within the minimum limit for both adults. In one embodiment, one or both adults may fully convert all of the units of the term policy to permanent insurance. In one embodiment, the increase may be a use or lose proposition, where if an adult does not elect to increase at the time interval, this possible increase is forfeited. Additionally, the family protection insurance policy may also limit the number of times, at the defined time intervals, the adults may increase, such that if an adult increases by the maximum amount at the first time interval, they may be precluded from increasing at the next time interval.

In one embodiment, the policy owner can fully or partial convert either adult's coverage into a permanent policy during the first 10 years of the policy or until the insured reaches the age 55, whichever occurs later. In the case of partial conversion, death benefit of the family protection policy is reduced by the converted amount. Conversion credit is offered during the first 10 policy years, in the amount of fifty percent (50%) of the total first year premium paid for the policy. If conversion occurs during the first policy year, conversion credit is fifty percent (50%) of first year term premiums paid. The actual percentage will be determined based on the amount converted by the insured in relation to the aggregate face amount for the policy. Proportional conversion credit may apply if only a proportion of total death benefit is converted.

With respect to the family protection insurance policy described in FIG. 3, the flow proceeds to determining if the conversion privilege policy has expired, step 174. In this example, the conversion privilege has a term of 10 years, therefore the determination is if the policy is at the end of the 10 year term. If the conversion privilege has expired, the family maintains the permanent insurance coverage for the converted units. In one embodiment, if an adult acquires the maximum number of units on a regular basis and additionally converts death benefits to a permanent policy, the adults, combined, may acquire a $2,000,000 million dollar permanent life insurance policy ($1,00,000 each adult) based on periodic increases of 2 units ($100,000) per a bi-annual period.

With respect to FIG. 3, if the term conversion privilege has not expired, a next determination is if it is at one of the predefined interval times, step 178, as may be done by a computing system providing the family protection insurance or even possible an insurance agent working with the family. If it is not at one of the time intervals, the policy remains as is until the answer to step 178 is in the affirmative. It is noted that during this time period, the adults may also again elect to convert units of death benefits to the permanent policy or decrease death benefits for the term policy, subject to the policies minimum amount.

When the time interval arrives, for example on the anniversary date of the inception of the policy, the method reverts back to step 162 where the adults are presented again with the option to increase term life policy units. As noted above, this step may be limited by the prohibition against maximum increases in consecutive time intervals. From step 162, the policy repeats until expiration at step 174 or until the adult terminates the term portion of the policy or the ninth policy anniversary for increases and the tenth policy anniversary or the anniversary when the insured's age is 55, whichever is later.

FIG. 4 illustrates one embodiment of a system 200 that provides for the family protection insurance policy as described above. The insurance policy may be provided through a computer program product including executable instructions stored on a computer readable medium. By way of example, a processor 202 may perform executable operations based on instructions received from the memory device 204. Through the operations, the processor may be operative to underwrite, provide and maintain the family protection insurance policy, including the term and permanent policy.

The system 200 includes the processor 202 and memory device 204, where the processor 202 is accessible by a user 206 operating a terminal device 208. It is also understood that the processor 202 and related components may be disposed directly within the computer 208.

In one embodiment, the system 200 further includes the insurance data storage device 210, operative to store information usable for conducting and maintaining the family protection insurance policy. For example, the device 210 may include actuarial tables used for underwriting the original term policy as well information for determining when and how many increments may be taken.

As illustrated in FIG. 4, the user 206 may be an insurance agent operative to manage the insurance policy as generated and run on the processor 202. The processor 202 can be operative to perform the computing operations described above, including the steps of the flowcharts of FIGS. 1 and 3. Through this flexible insurance plan, adults may adjust their insurance needs consistent with their family growth.

FIGS. 1-4 are conceptual illustrations allowing an explanation of the present invention. It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms machine readable medium, computer program medium, and computer usable medium are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment. Other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, it is not intended for any term in the specification or claims to be ascribed an uncommon or special meaning unless explicitly set forth as such. Further, the present invention encompasses present and future known equivalents to the known components referred to herein by way of illustration.

While the invention has been described and illustrated in connection with various embodiments, many variations and modifications as to be evident to those of skill in the relevant art(s) may be made without departing from the spirit and scope of the invention, and the invention is thus not to be limited to the precise details of methodology or construction set forth above, as such variations and modifications are intended to be included within the scope of the invention. It is to be understood by those of ordinary skill in the relevant art(s) that the various data processing tasks described herein may be implemented in a wide variety of ways, many of which are known and many more of which are doubtless to be hereafter developed. For example, a wide variety of computer programs and languages are now known, and are likely to be developed, which are suitable for storing, accessing, and processing data, as well as for performing, processing, and using actuarial forecasts and other analyses as disclosed herein. Except to the extent necessary or inherent in the processes themselves, no particular order to steps or stages of methods or processes described in this disclosure, including the figures, is implied. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). Thus, the present invention should not be limited by any of the above-described exemplary embodiments, but should be defined only in accordance with the following claims and their equivalents.

What is claimed is:

1. A computer implemented method of providing life insurance comprising:
    underwriting and issuing, using a computing device, a term life insurance policy for two adults, the term life insurance having at least two face amount limits and one premium amount, a first of the at least two face amount limits representing a minimum face amount and a second of the two face amount limits representing a maximum face amount that is greater than the minimum face amount, the term life insurance policy provisioned for an insured to purchase additional coverage up to the maximum face amount and to convert a portion of a face amount of the policy in excess of the minimum face amount into permanent insurance;
    at a plurality of predefined time intervals from issuance of the term life insurance policy, increasing, using the computing device, a face amount of the term life insurance policy by an incremental unit without any additional underwriting, wherein the increasing is up to the maximum face value; and
    at a plurality of times during the term of the term life insurance policy, converting at each of the plurality of times, using the computing device, at least a portion of the face amount to permanent insurance, wherein a total permanent insurance is up to two times the maximum face amount of the term life insurance policy.

2. The computer implemented method of claim 1, further comprising: underwriting the term life insurance policy for domestic partners of a family.

3. The computer implemented method of claim 2, further comprising: insuring each of a plurality of children of the domestic partners at no additional cost.

4. The computer implemented method of claim 3, wherein insuring dependents comprises insuring all children of the domestic partners at the issuance of the term insurance policy.

5. The computer implemented method of claim 4, wherein insuring all children comprises insuring children not yet born to the domestic partners at the issuance of the term insurance policy.

6. The computer implemented method of claim 1, wherein the incremental unit is one half of the minimum face amount.

7. The computer implemented method of claim 1, further comprising: incrementing an annual or modal premium cost for the term life insurance policy based on the increased face amount at the predefined time intervals.

8. The computer implemented method of claim 1, further comprising: providing the insured an option to increase a death benefit amount of the term life insurance policy; and increasing the face amount of the term life insurance policy if the insured elects the option.

9. The computer implemented method of claim 1, further comprising: providing the insured an option to convert the portion of the face amount to the permanent insurance; and converting the portion of the face amount to the permanent insurance if the insured elects the option.

10. A computer implemented method of providing life insurance relating to family planning, the method comprising:
    underwriting, using a computing device, a term life insurance policy for two adults for a policy amount, where the policy is written for a range between a minimum limit and a maximum limit and insures each of a plurality of children at no additional cost, the term life insurance policy provisioned for an insured to purchase additional coverage up to the maximum limit and to convert a portion of a face amount of the policy in excess of the minimum limit into permanent insurance;
    at a plurality of predefined time intervals from the underwriting of the policy, increasing, using the computing device, the policy amount by incremental units without any additional underwriting, the term life insurance policy increased to the maximum limit; and
    at a plurality of times during the term of the term life insurance policy, converting at each of the plurality of times at least a portion of the policy amount to permanent insurance, wherein a total permanent insurance is up to two times the maximum limit of the term life insurance policy.

11. The computer implemented method of claim 10, further comprising: underwriting the term life insurance policy for both adults of a family.

12. The computer implemented method of claim 10, wherein adults includes life partners, married couples, two cohabitating adults, or business partners.

13. The computer implemented method of claim 10, further comprising: including a nominal death benefit for any eligible dependents at no additional charge.

14. The computer implemented method of claim 10, wherein the incremental units is are one half of the minimum limit of the term life insurance policy.

15. The computer implemented method of claim 10, wherein the total permanent insurance is up to two times the maximum limit of the term life insurance policy.

16. The computer implemented method of claim 10, further comprising: incrementing an annual premium cost for the term life insurance policy based on the increased policy amount at the predefined time interval.

17. The computer implemented method of claim 10, wherein the one or more time intervals occurs at a two year time iteration.

18. The computer implemented method of claim 10, further comprising: providing the insured an option to increase a death benefit amount of the term life insurance policy; and increasing the policy amount of the term life insurance policy if the insured elects the option.

19. The computer implemented method of claim 10, further comprising: providing the insured an option to convert the portion of the policy amount to the permanent insurance; and converting the portion of the policy amount to the permanent insurance if the insured elects the option.

20. A non-transitory computer readable media with one or more computer programs stored thereon that when executed by a computing device;
causes the computing device to perform method steps comprising:
underwriting a term life insurance policy for two adults for a policy amount, the term life insurance having at least two face amount limits, a first of the at least two face amount limits representing a minimum face amount and a second of the two face amount limits representing a maximum face amount that is greater than the minimum face amount, the term life insurance policy provisioned for an insured to purchase additional coverage up to the maximum face amount and to convert a portion of a face amount of the policy in excess of the minimum face amount into permanent insurance;
at a plurality of predefined time intervals during the term of the term life insurance policy, increasing the policy amount by at least one of a plurality of incremental units without any additional underwriting, wherein the increase is up to the maximum face value; and
at a plurality of times during the term of the term life insurance policy, converting at each of the plurality of times at least a portion of the policy amount to permanent insurance, wherein a total permanent insurance is up to two times the maximum face amount of the term life insurance policy.

21. The non-transitory computer readable media of claim 20, the method steps comprising: at another time during the term of the policy, converting a second portion of the policy amount to permanent insurance; and increasing again the policy amount of the term life insurance up to the maximum face amount without any additional underwriting.

22. The non-transitory computer readable media of claim 20, the method steps comprising underwriting the term life insurance policy for domestic partners of a family.

23. The non-transitory computer readable media of claim 22, the method steps comprising insuring each of a plurality of dependents of the domestic partners at no additional cost.

24. The non-transitory computer readable media of claim 23, the method steps comprising insuring all eligible children of the domestic partners at issuance of the term insurance policy.

25. The non-transitory computer readable media of claim 24, wherein insuring all children comprises insuring children not yet born to the domestic partners at issuance of the term insurance policy.

26. The non-transitory computer readable media of claim 20, wherein the at least one of a plurality of incremental units is one half of the minimum face amount.

27. The non-transitory computer readable media of claim 20, the method steps comprising incrementing an annual or modal premium cost for the term life insurance policy based on the increased policy amount at the predefined time intervals.

28. The non-transitory computer readable media of claim 20, the method steps comprising providing the insured an option to increase a death benefit amount of the term life insurance policy; and increasing the policy amount of the term life insurance policy if the insured elects the option.

29. The non-transitory computer readable media of claim 20, the method steps comprising providing the insured an option to convert the portion of the policy amount to the permanent insurance; and converting the portion of the policy amount to the permanent insurance if the insured elects the option.

* * * * *